United States Patent
Yamada et al.

(10) Patent No.: US 12,231,067 B2
(45) Date of Patent: Feb. 18, 2025

(54) MOTOR CONTROLLER

(71) Applicants: Kabushiki Kaisha Toshiba, Tokyo (JP); Toshiba Electronic Devices & Storage Corporation, Tokyo (JP)

(72) Inventors: Yutaka Yamada, Fuchu Tokyo (JP); Koji Suzuki, Fuchu Tokyo (JP); Ken Tanabe, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 176 days.

(21) Appl. No.: 18/115,550

(22) Filed: Feb. 28, 2023

(65) Prior Publication Data
US 2024/0097590 A1 Mar. 21, 2024

(30) Foreign Application Priority Data
Sep. 20, 2022 (JP) .................. 2022-149340

(51) Int. Cl.
*H02P 23/16* (2016.01)
*H02P 23/00* (2016.01)

(52) U.S. Cl.
CPC .......... *H02P 23/16* (2016.02); *H02P 23/0022* (2013.01)

(58) Field of Classification Search
CPC G06N 20/00; G06N 3/08; G06N 3/02; G06N 3/049; G06N 3/088; G06N 5/025; G05B 13/0265; G05B 19/18; H02P 23/0022; H02P 23/16; H02P 23/0004; B25J 9/163
See application file for complete search history.

(56) References Cited

U.S. PATENT DOCUMENTS 10,503,130 B2 * 12/2019 Ikai .................. G06N 20/00

FOREIGN PATENT DOCUMENTS

| JP | H05-297904 A | 11/1993 |
|---|---|---|
| JP | 5088413 B2 | 12/2012 |
| JP | 6577508 B2 | 9/2019 |
| WO | 2010/024194 A1 | 3/2010 |

OTHER PUBLICATIONS https://www.researchgate.net/publication/339656951_Improve_PID_controller_through_reinforcement_learning.

* cited by examiner

*Primary Examiner* — Antony M Paul
(74) *Attorney, Agent, or Firm* — Kim & Stewart LLP

(57) ABSTRACT

A motor controller includes a first control circuit, a second control circuit, a determination circuit, and a command circuit. The first control circuit outputs a first control value based on a rule base from a command value of an angular velocity and a measured value of an angular velocity. The second control circuit outputs a second control value based on a learned model from the command value of the angular velocity and the measured value of the angular velocity. The determination circuit determines a state based on at least the second control value. The command circuit acquires and outputs a control command value from the first control value and the second control value based on a result determined by the determination circuit.

16 Claims, 7 Drawing Sheets

MOTOR CONTROLLER

CROSS REFERENCE TO THE RELATED APPLICATIONS

This application is based upon and claims the benefit of priority from the Japanese Patent Application No. 2022-149340, filed on Sep. 20, 2022, the entire contents of which are incorporated herein by reference.

FIELD

Embodiment of the present invention relates to a motor controller.

BACKGROUND

Motors have been used in various devices, and control of the motors has been widely researched and developed for a long time. In particular, it is necessary to obtain the operation of the motor and feed it back to the control for appropriate motor control.

According to a PI control controller according to a rule base, a stable operation can be realized by a classical method, but delay or pulsation caused by feedback control occurs. As a recent research, there is an example of a controller using a model learned by machine learning. According to this method, it is possible to achieve flexible and advanced control to suppress delay and pulsation, but processing inside the model is a black box, and there is a problem that it is difficult to ensure or explain a complete operation.

DETAILED DESCRIPTION

According to one embodiment, a motor controller includes a first control circuit, a second control circuit, a determination circuit, and a command circuit. The first control circuit outputs a first control value based on a rule base from a command value of an angular velocity and a measured value of an angular velocity. The second control circuit outputs a second control value based on a learned model from the command value of the angular velocity and the measured value of the angular velocity. The determination circuit determines a state based on at least the second control value. The command circuit acquires and outputs a control command value from the first control value and the second control value based on a result determined by the determination circuit.

Hereinafter, embodiments will be described with reference to the drawings.

Figure 1:
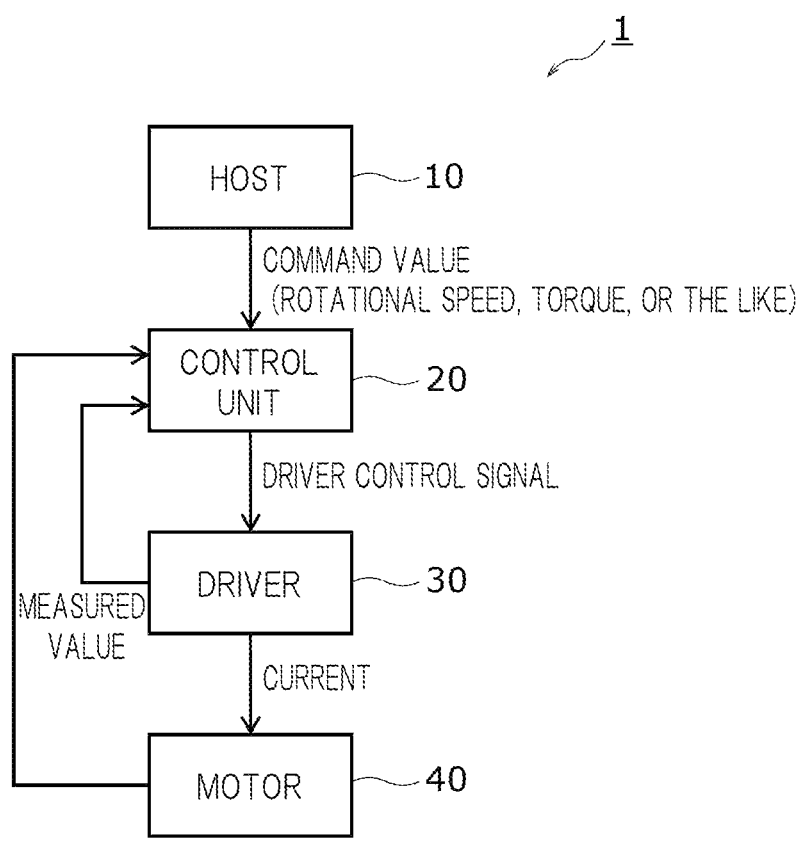
FIG. 1 is a diagram schematically illustrating an example of a motor system according to an embodiment.

FIG. 1 is a diagram schematically illustrating an example of a motor system according to an embodiment. A motor system 1 includes, for example, a host 10, a control unit 20, a driver 30, and a motor 40. The motor system 1 is a system that appropriately drives the motor 40.

The host 10 is, for example, a computer. The host 10 transmits command values such as rotational speed and torque for driving the motor 40 to the control unit 20. The host 10 includes, for example, an input/output interface that exchanges data with a user, generates a command value for driving the motor 40 with a value input by the user, and outputs the command value to the control unit 20. Further, the host 10 may be a computer for automatically appropriately driving the motor 40, and in this case, outputs an appropriate command value set in the host 10 to the control unit 20.

The control unit 20 generates a driver control signal necessary for the driver 30 to drive the motor 40, and outputs the driver control signal to the driver 30. The control unit 20 receives a measured value acquired from an actual operation of the motor 40 from the driver 30, the motor 40, or a peripheral module thereof. In order for the motor 40 to be driven in accordance with the command value from the host 10, the control unit 20 generates the control signal based on the received command value and the received measured value, and outputs the control signal to the driver 30.

The driver 30 generates a signal for driving the motor 40 based on the control signal received from the control unit 20, and outputs the signal for driving the motor 40, for example, a current.

The motor 40 performs rotational movement with angular velocity, torque, or the like according to the command value based on the signal output from the driver 30. A sensor may be attached to the outside of the motor 40, and this sensor may feed back information such as angular velocity and torque in the motor to the control unit 20.

Figure 2:
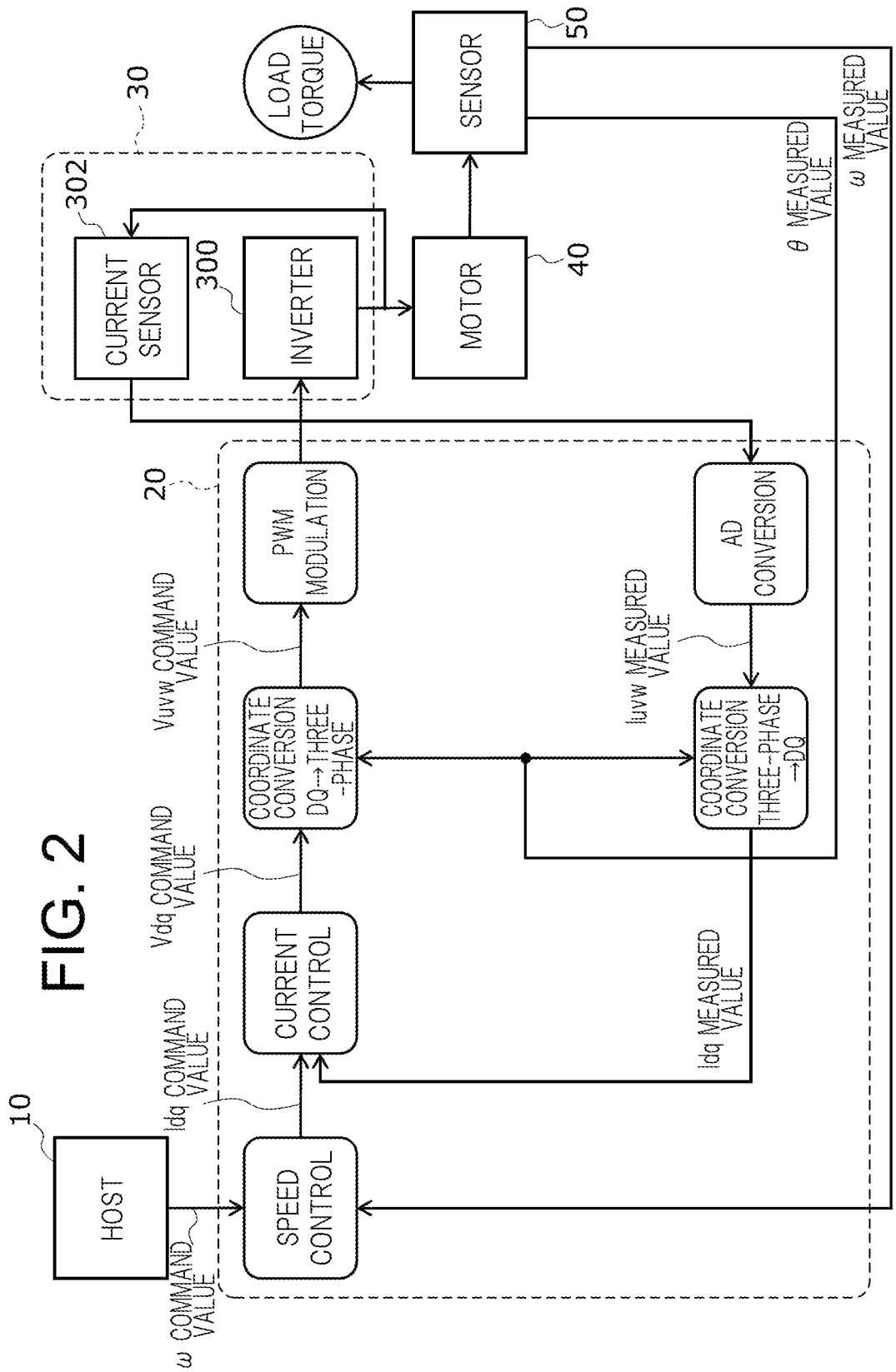
FIG. 2 is a diagram schematically illustrating an operation of the motor system according to the embodiment.

FIG. 2 is a diagram schematically illustrating an operation of the motor system according to the embodiment.

The host 10 transmits command values related to an angular velocity $\omega$ and the like of the motor to the control unit 20. In addition to the angular velocity, a command value such as torque may be transmitted.

The control unit 20 acquires a command value of current Idq in a speed control system from the received command value of angular velocity $\omega$ and the received measured value of the angular velocity $\omega$. This speed control is, for example, control related to PI control. The present invention is not limited to this, and similar processing can be performed even with PID control or the like. That is, a portion described as rule-based PI control in the following can be appropriately rewritten as rule-based PID control or another rule-based control. Note that a subscript dq indicates a vector indicated in a DQ coordinate system, but is not limited thereto, and may be one or more scalar values including necessary information. The same applies to the following.

The control unit 20 acquires a command value of voltage Vdp in a current control system from the command value of the current Idq and a measured value of the current Idq.

The control unit 20 performs coordinate conversion from the DQ coordinate system to a three-phase coordinate system for adapting to a three-phase motor from the command value of the voltage Vdp and a measured value of a rotor position $\theta$, to acquire a command value of a voltage Vuvw.

The control unit 20 performs pulse width modulation (PWM) on the command value of the voltage Vuvw, and transmits the command value to an inverter 300 of the driver 30.

The inverter 300 that has received the command value generates an appropriate AC signal for driving the motor and outputs the AC signal to the motor 40. A current sensor 302 monitors a current output from the inverter 300 and feeds back the current to the control unit 20.

The motor 40 is driven at an angular velocity according to the command value by an alternating current output from the inverter 300.

A sensor 50 monitors the angular velocity ω, the rotor position θ, a torque T, and the like of the motor 40, and feeds back necessary acquired data to the control unit 20.

The control unit 20 executes each of the above processing based on the measured value of the angular velocity ω transmitted from the sensor 50, the rotor position θ, and a measured value of a motor current I transmitted from the driver 30.

The measured value of the angular velocity ω is fed back to the speed control system and reflected in the command value of the current Idq.

The measured value of the current I is first subjected to analog to digital (AD) conversion to be converted into a current Iuvw that is a PWM signal. Based on the measured value of the rotor position θ and the current Iuvw, the measured value of the current Idq converted from the three-phase coordinate system to the DQ coordinate system is fed back to the current control system and reflected in a command value of a voltage Vdq.

Furthermore, the measured value of the rotor position θ is reflected in the command value of the voltage Vuvw.

Further, in the above processing, when the measured value of the angular velocity ω can be estimated from a measured value of the current Iuvw, an estimated measured value of the angular velocity ω may be used as the measured value, and when the rotor position θ can be estimated from the measured value of the current Iuvw, an estimated measured value of the rotor position θ may be used as the measured value.

By executing such an operation, the motor 40 is controlled based on the command value instructed by the host 10. Hereinafter, the control unit 20 that controls the driver 30 will be mainly described in detail.

Further, in the following, each configuration will be described as a circuit, but at least a part of the circuit may be an analog circuit or a digital circuit, and the circuit may be configured to include a programmable circuit such as a field programmable gate array (FPGA), a dedicated circuit such as an application specified integrated circuit (ASIC), or a general-purpose circuit (processor) such as a central processing unit (CPU).

In at least a part of processing, when information processing by software is specifically implemented by using a hardware resource such as a processor, the information processing may be implemented by referring to a program, an execution file, or the like stored in a storage circuit (not illustrated) by the hardware resource.

First Embodiment

Figure 3:
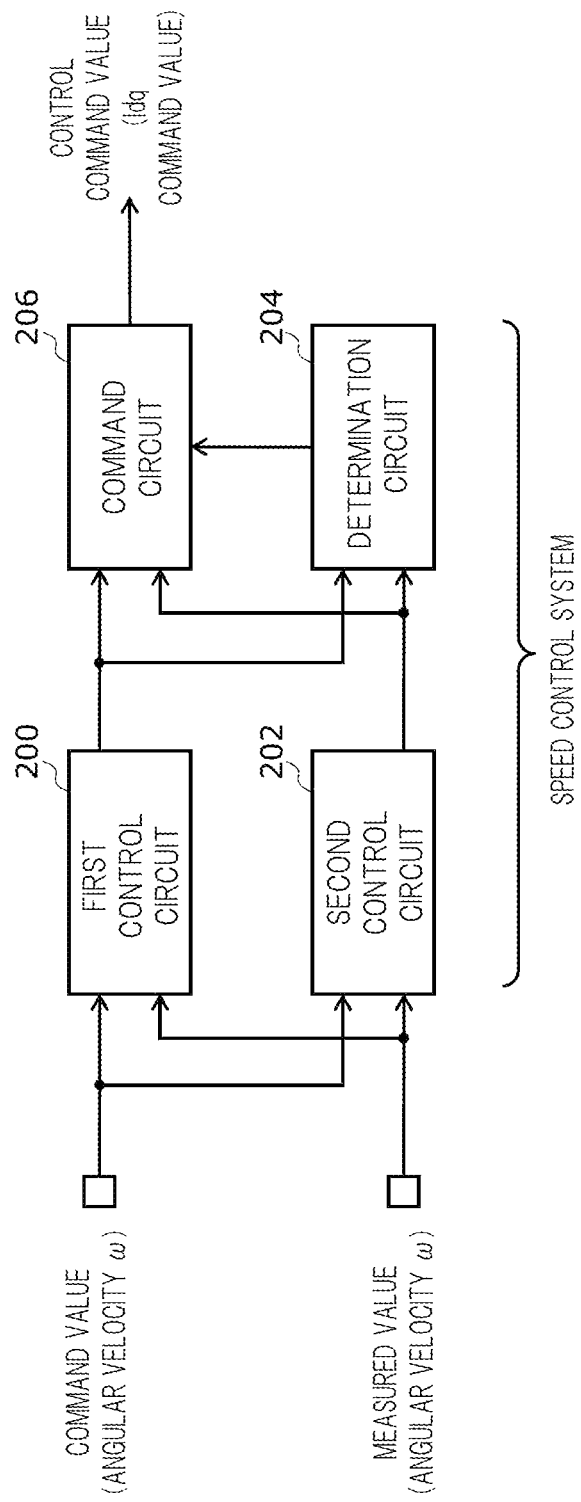
FIGS. 3 to 6 are diagrams schematically illustrating an example of a part of a control unit according to the embodiment.

FIG. 3 is a diagram schematically illustrating an example of a speed control system of the control unit 20 (a motor controller) according to the embodiment. The speed control system of the control unit 20 includes at least a first control circuit 200, a second control circuit 202, a determination circuit 204, and a command circuit 206.

The first control circuit 200 acquires the command value of the angular velocity ω and the measured value of the angular velocity ω. The first control circuit 200 outputs a first control value according to, for example, a rule-based function that performs PI control based on the command value and the measured value of the angular velocity, or a look up table (LUT). The first control value is, for example, the command value of the current Idq.

The second control circuit 202 acquires the command value of the angular velocity ω and the measured value of the angular velocity ω. For example, when the command value and the measured value of the angular velocity are input, the second control circuit 202 outputs a second control value using a learned model that outputs a command value related to the current Idq. The second control value is, for example, the command value of the current Idq.

The learned model may be a model formed by a neural network model of an arbitrary form and learned by a machine learning method. As a non-limiting example, the learned model may be a model optimized so that output information can be acquired from input information described above by reinforcement learning, or may be a model learned using a more general error back propagation method.

That is, the learned model is a model in which a neural network model formed in a form in which the output information can be acquired from the input information is optimized by learning so that appropriate output information can be acquired using an arbitrary machine learning method. The same applies to the following embodiments.

In addition, the second control circuit 202 may acquire a degree of appropriate control based on a measured value fed back, and reflect (relearn) the degree in the learned model. For example, when the learned model is a model learned by reinforcement learning, the second control circuit 202 can also learn a reward, a value, and a measure in an inference process in real time.

The determination circuit 204 determines a state based on the first control value and the second control value. The state is a state indicating whether the control value is normal or abnormal. For example, the determination circuit 204 determines whether the second control value output from the second control circuit 202 is appropriate. This determination will be described in detail in the embodiments described below.

Note that the determination circuit 204 receives at least one of the command value or the measured value in addition to those illustrated in the drawing, and can also use the received value for determination. Further, the determination circuit 204 can also make a determination without using the first control value. The same applies to the following embodiments.

The command circuit 206 acquires a control command value (the command value of the current Idq) from the first control value and the second control value based on a determination result of the determination circuit 204, and outputs the control command value. For example, the command circuit 206 outputs the second control value as the control command value when the determination circuit 204 determines that the state is normal, and outputs the first control value as the control command value when the determination circuit 204 determines that the state is abnormal.

That is, the control unit 20 according to the present embodiment includes the first control circuit 200 that outputs the first control value based on a rule base from the command value of the angular velocity and the measured value of the angular velocity, the second control circuit 202 that outputs the second control value based on the learned model from the command value of the angular velocity and the measured value of the angular velocity, the determination circuit 204 that determines the state based on at least the second control value, and the command circuit 206 that acquires and outputs the control command value from the first control value and the second control value based on the determination result.

As described above, according to the present embodiment, when the value of the current Idq output from the learned model to which the command value and the measured value are input is normal, the second control value output from the learned model is output as the current Idq, and when the second control value is abnormal, the first control value acquired by the rule-based PI control is output as the command value of the current Idq.

As a result, in a state in which no abnormality occurs, the cost is low using the learned model, and it is possible to acquire a flexible current command value, and in a state in which the output of the learned model is abnormal, it is possible to acquire a current command value by PI control with high stability.

Second Embodiment

Figure 4:
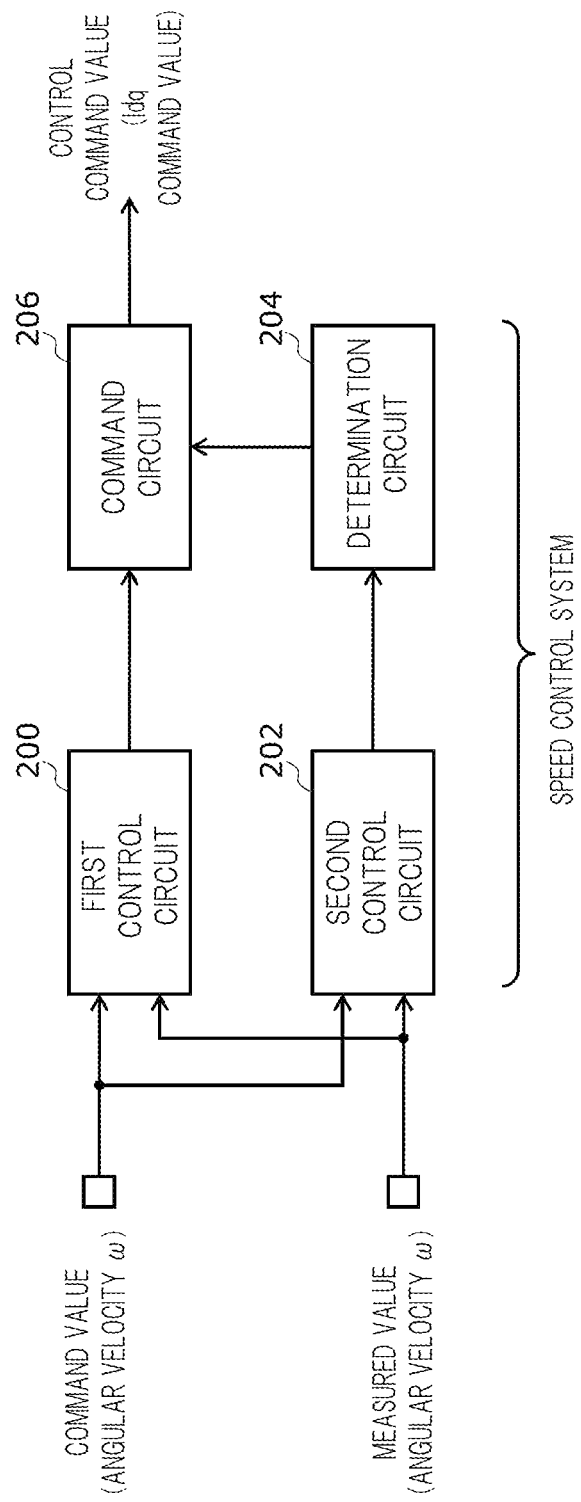

FIG. 4 is a diagram schematically illustrating an example of the speed control system of the control unit 20 according to the embodiment. As in the first embodiment, the speed control system of the control unit 20 includes at least the first control circuit 200, the second control circuit 202, the determination circuit 204, and the command circuit 206.

The configurations of the first control circuit 200 and the second control circuit 202 are similar to those of the first embodiment. However, in the present embodiment, the learned model used in the second control circuit 202 is a learned model different from that of the first embodiment.

The learned model in the present embodiment outputs a value obtained by subtracting an output value in a case of following the rule base from an appropriate output value for the input value. That is, the second control value is a value (vector or one or more scalars) that is a control command value when added to the output value in the case of following the rule base.

The determination circuit 204 determines whether the second control value is normal or abnormal, and outputs the determination result. As the determination result, for example, when the second control value is normal, the second control value can be output, and when the second control value is abnormal, 0 can be output.

The command circuit 206 sums the first control value received from the first control circuit 200 and the determination result output from the determination circuit 204 and outputs the sum as the control command value.

As described above, according to the present embodiment, the control unit 20 can output a value obtained by adding the second control value to the first control value as the control command value when the second control value output from the learned model is normal, and can output the first control value as the control command value when the second control value is abnormal. Similarly to the first embodiment, flexible and advanced control by the learned model can be achieved, and stable control based on the rule base can be performed when the output of the learned model is abnormal.

Third Embodiment

In the present embodiment, detection of an abnormal value in the determination circuit 204 will be described.

As a non-limiting example, as described above, the learned model used in the second control circuit 202 may be a learned model learned by using reinforcement learning. In this case, the second control circuit 202 may output the reward as the second control value to determination circuit 204 together with a difference (hereinafter referred to as a control command value or the like) from the control command value or the control command value in the rule base as the second control value. The determination circuit 204 may determine whether the reward output from the second control circuit 202 is within an appropriate range, determine that it is normal when the reward is within the appropriate range, and determine that it is abnormal in other cases.

As a non-limiting example, the learned model may be a model learned as a model that outputs likelihood (or probability of being normal) together with the control command value or the like. The second control circuit 202 outputs the likelihood to the determination circuit 204 together with the control command value or the like output from the learned model. The determination circuit 204 may determine normality or abnormality, for example, by comparing the likelihood with a predetermined threshold value. The determination circuit 204 may, for example, determine that it is normal when the likelihood is higher than the predetermined threshold, and determine that it is abnormal in other cases.

According to the above two examples, the control unit 20 can perform control using the output value of the learned model more effectively.

As a non-limiting example, the determination circuit 204 may include a circuit such as a buffer to which the measured value of the current Idq is further input and which stores a past measured value and a past second control value. The determination circuit 204 may acquire respective differences between the measured value and the second control value at a certain time point in the past, for example, one control time unit before, and the measured value and the second control value at a current control time, and determine whether it is normal or abnormal based on whether positive/negative signs of the differences match.

As a non-limiting example, in the same configuration as described above, when a difference between the difference between the measured values and the difference between the second control values falls within a predetermined range, it may be determined that it is normal, and when the difference is not within the predetermined range, it may be determined that it is abnormal.

According to the above two examples, the control unit 20 can achieve stable control according to the rule base when an abnormality can occur due to overshoot or when the difference between the control values is too small and the delay can occur.

As a non-limiting example, in a configuration similar to that of the first embodiment, the determination circuit 204 may make the determination based on whether a difference between the first control value and the second control value is within a predetermined range. When the difference between the first control value and the second control value is within the predetermined range, the determination circuit 204 may determine that it is normal, and when the difference is not within the predetermined range, the determination circuit 204 may determine that it is abnormal.

According to the above examples, the control unit 20 essentially follows the rule base, but it is possible to perform advanced control by the learned model more than the control value obtained by the rule base at the normal time, and it is possible to perform control focusing on stability when the control value obtained by the learned model is excessively dissociated from the control value obtained by the rule base.

Fourth Embodiment

In each of the above-described embodiments, the control for the speed control system has been described, however, a mode in the present disclosure can be extended not only to the speed control system but also to the current control system. Note that for a learning method of the learned model and a determination method in the determination circuit 204, a form similar to that of the above-described embodiments can be taken as long as there is no contradiction. Although the figure illustrates a case where the learned model outputs a difference between the command values similarly to the second embodiment, the command value of the learned model may also be the control command value similarly to the first embodiment.

Figure 5:
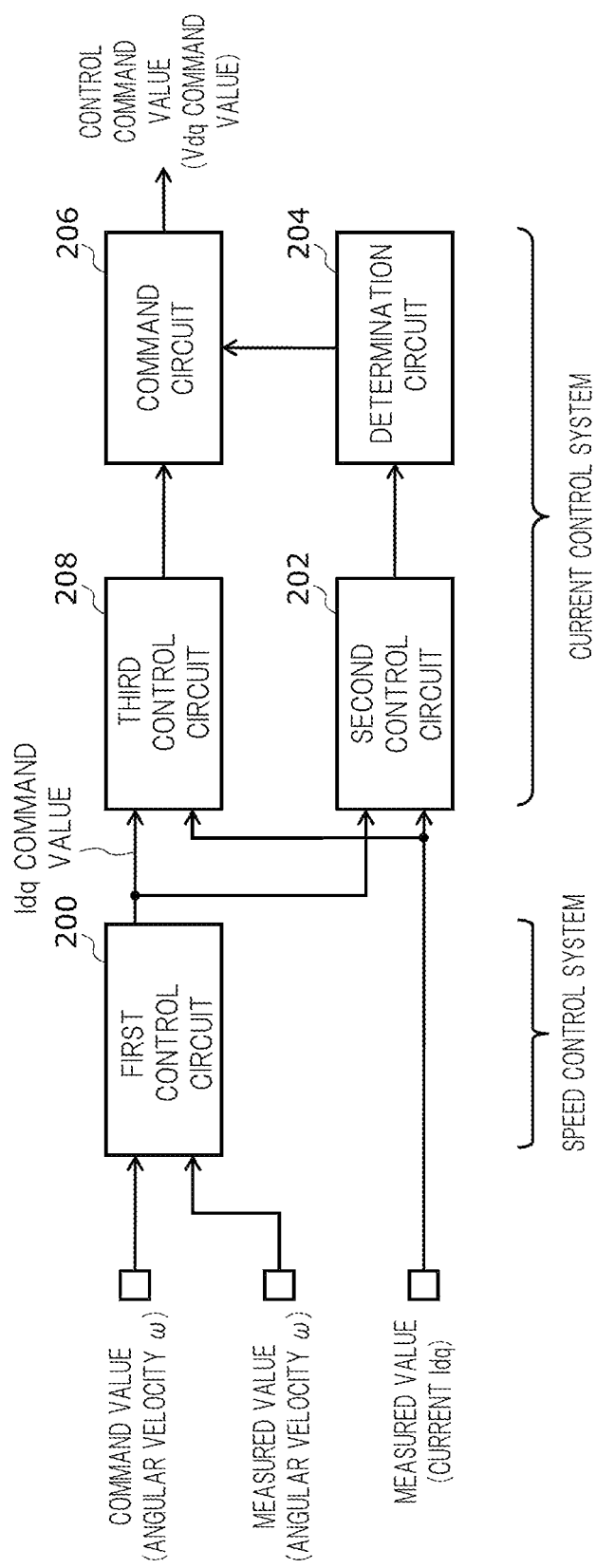

FIG. 5 is a diagram schematically illustrating an example of a part of the control unit 20 according to the embodiment. The control unit 20 includes the first control circuit 200, the second control circuit 202, the determination circuit 204, and the command circuit 206 as in the above-described embodiments, and further includes a third control circuit 208. Unlike the above-described embodiments, the first control circuit 200 is included in the speed control system, and the third control circuit 208 is included in the current control system in addition to the second control circuit 202, the determination circuit 204, and the command circuit 206.

The first control circuit 200 outputs the command value of the current Idq, which is the first control value based on the rule base, using the command value of the angular velocity ω and the measured value of the angular velocity ω.

The second control circuit 202 outputs the second control value based on the learned model using the command value (first control value) of the current Idq and the measured value of the current Idq. The second control value may be the command value of the voltage Vdq as in the first embodiment, or may be a value obtained by subtracting a command value according to the rule base from the command value of the voltage Vdq as in the second embodiment.

The third control circuit outputs the command value of the voltage Vdq, which is a third control value based on the rule base, using the command value of the current Idq and the measured value of the current Idq.

The determination circuit 204 determines whether the second control value is normal or abnormal based on at least the second control value. The determination method is a method obtained by replacing the first control value with the third control value in each of the above-described embodiments.

The command circuit 206 outputs a command value of an appropriate voltage Vdq based on the determination of the determination circuit 204. The operation of the command circuit 206 is also an operation obtained by replacing the first control value with the third control value in each of the above-described embodiments.

As described above, according to the present embodiment, it is possible to acquire the control value using the learned model not in the speed control system but in the current control system. Also in this case, the stable control based on the rule base can be appropriately performed together with advanced control by the learned model.

Fifth Embodiment

Figure 6:
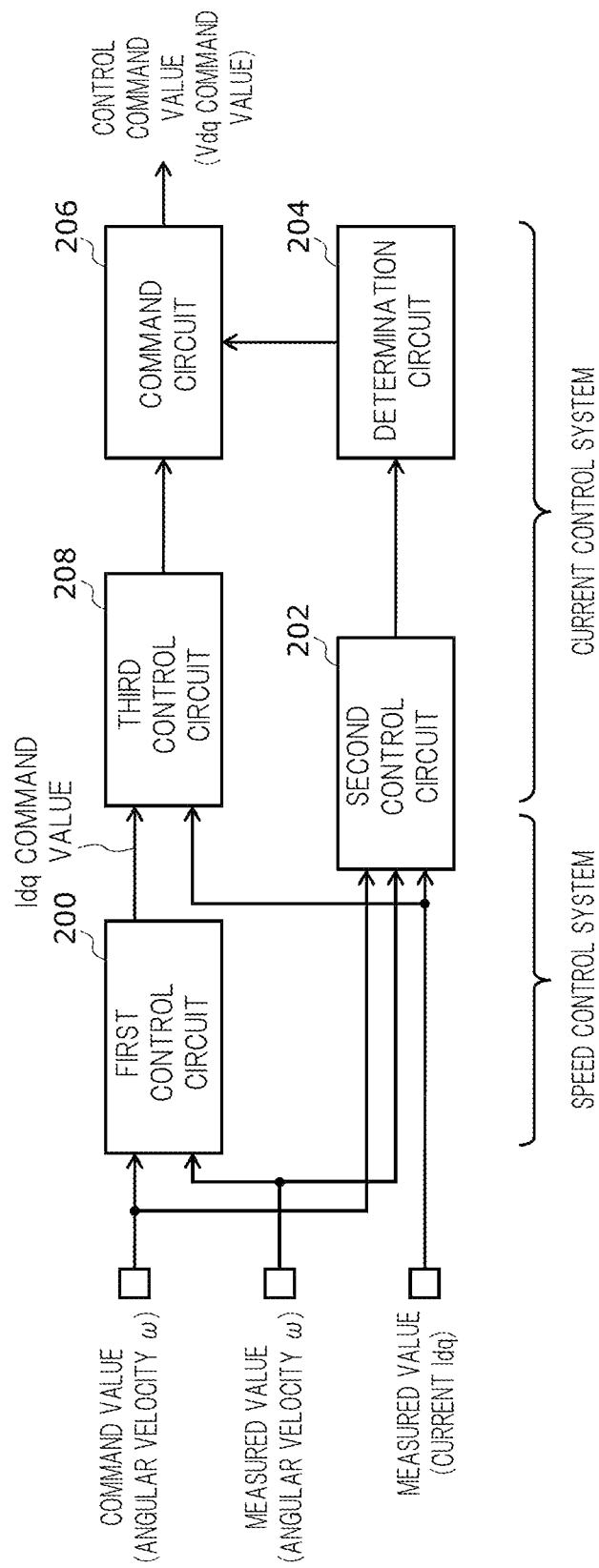

FIG. 6 is a diagram schematically illustrating an example of a part of the control unit 20 according to the embodiment. The control unit 20 includes the first control circuit 200, the second control circuit 202, the determination circuit 204, and the command circuit 206 as in the above-described fourth embodiment, and further includes the third control circuit 208. The first control circuit 200 and the second control circuit 202 are included in the speed control system, and the second control circuit 202, the determination circuit 204, the command circuit 206, and the third control circuit 208 are included in the current control system. That is, the second control circuit 202 performs processing of both the speed control system and the current control system.

The first control circuit 200 outputs the command value of the current Idq, which is the first control value based on the rule base, using the command value of the angular velocity ω and the measured value of the angular velocity ω.

The second control circuit 202 outputs the second control value based on the learned model using the command value of the angular velocity ω, the measured value of the angular velocity ω, and the measured value of the current Idq. The second control value is the same as that in the fifth embodiment described above.

The learned model used in the second control circuit 202 is learned as a model that outputs the command value of the voltage when the command value of the angular velocity, the measured value of the angular velocity, and the measured value of the current are input. In addition, the learned model may be one neural network model, or may be formed by two models of a model that outputs the command value of the current from the command value of the angular velocity and the measured value of the angular velocity, and a model that outputs the command value of the voltage from the command value of the current and the measured value of the current.

As described above, the second control circuit 202 can achieve processing, in which the speed control system and the current control system are combined, by the learned model.

The third control circuit 208, the determination circuit 204, and the command circuit 206 are similar to those of the fifth embodiment described above.

That is, the control unit 20 includes: the first control circuit 200 that outputs a first control value related to the speed control based on the rule base from the command value of the angular velocity and the measured value of the angular velocity; the second control circuit 202 that outputs the second control value related to the current control based on the learned model from the first control value and the measured value of the current; the third control circuit 208 that outputs the third control value related to the current control based on the rule base from the first control value and the measured value of the current; the determination circuit 204 that determines a state based on at least the second control value; and the command circuit 206 that acquires and outputs the control command value related to the current control from the second control value and the third control value based on a result determined by the determination circuit.

As described above, it is possible to acquire a control value obtained by performing the speed control and the current control using the learned model as a part of the control unit 20. Also in this case, the stable control based on the rule base can be appropriately performed together with advanced control by the learned model.

Sixth Embodiment

Figure 7:
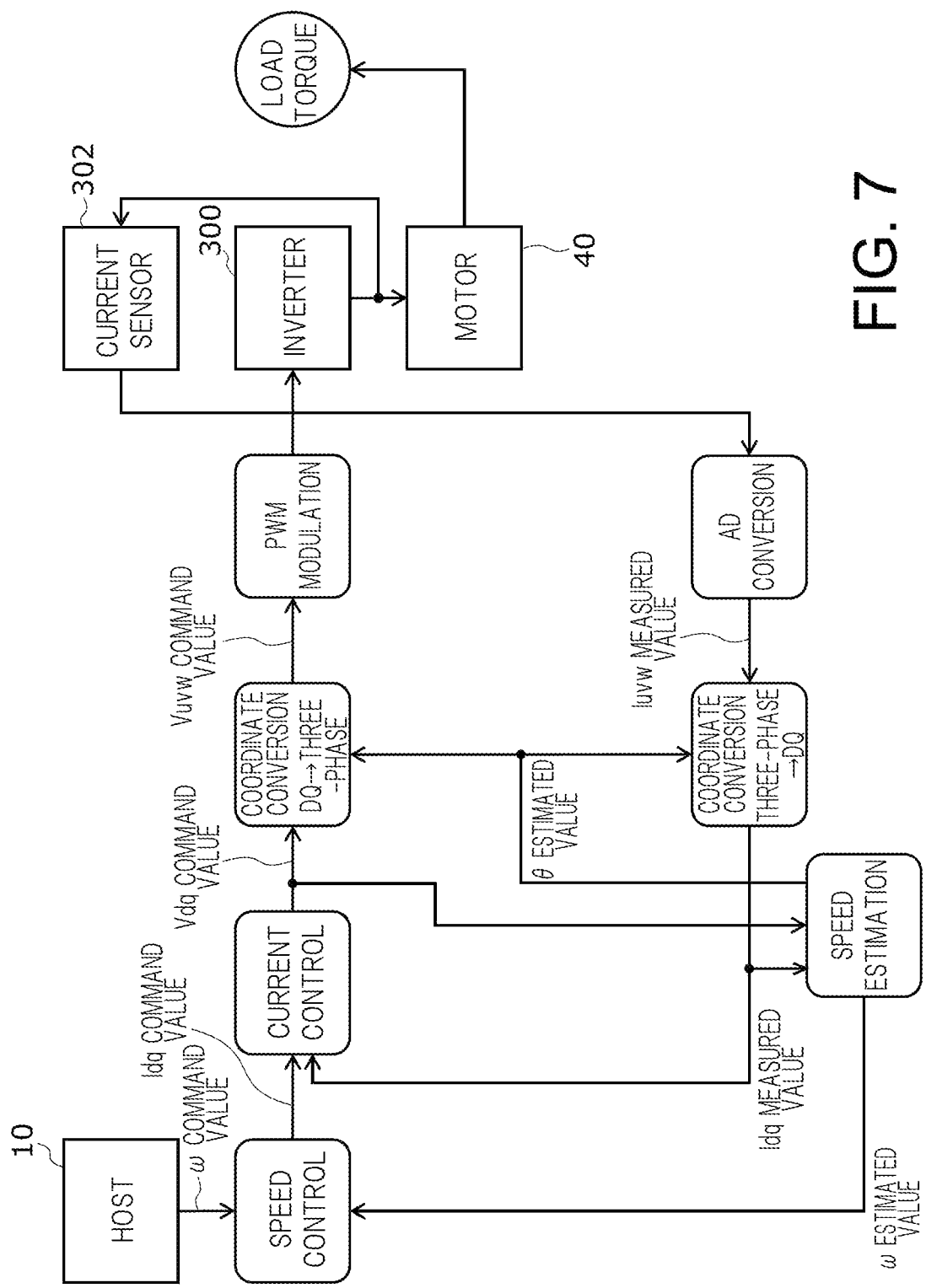
FIG. 7 is a diagram schematically illustrating an example of a motor system according to an embodiment.

FIG. 7 is a diagram illustrating an example of the motor controller according to the embodiment. In each of the above-described embodiments, actual measured values acquired by the sensor are used as the measured value of the rotor position θ and the measured value of the angular velocity ω, but a mode of the present disclosure is not limited thereto.

As illustrated in FIG. 7, the control unit 20 may estimate the measured values of the rotor position θ and the angular velocity ω from the measured value of the current Idq and the command value of the voltage Vdq. The control unit 20 can estimate the measured values of the rotor position θ and the angular velocity ω using, for example, the rule-based function, the LUT, or the learned model, and perform control processing in each of the above-described embodiments.

As another example, although not illustrated in the figure, the control unit 20 may estimate the measured values of the rotor position θ and the angular velocity ω from the command value of the current Idq and the measured value of the current Idq.

As described above, the control unit 20 may perform an operation of estimating the rotor position θ and the angular velocity ω.

Note that in the above description, both the rotor position θ and the angular velocity ω are estimated, but the present invention is not limited thereto. The motor system 1 may include, for example, the sensor 50 that measures either the rotor position θ or the angular velocity ω. In this case, a measured value that is not actually measured by the sensor 50 can also be estimated as by the control unit 20 in the present embodiment. Further, for this estimation, a value acquired by the sensor 50 may be used.

For example, the sensor 50 may actually measure the rotor position θ, and the control unit 20 may estimate the measured value of the angular velocity ω from necessary information among the measured value of the rotor position θ, the command value of the voltage Vdq, and the measured value of the current Idq. Conversely, the sensor 50 may actually measure the angular velocity ω, and the control unit 20 may estimate the measured value of the rotor position θ from necessary information.

In the present embodiment, expression of estimation of the measured value is used, but this means that the actual measured value in a case where the sensor 50 does not acquire the actual measured value is estimated, unlike a case where the sensor 50 acquires information as the actual measured value. That is, this expression is an expression that means a difference between that the sensor 50 senses the actual operation of the motor and that the control unit 20 estimates the actual operation of the motor.

Note that in the above description, as some examples, it is explained that the measured values used in the speed control system are estimated using the command value or the actual measured value of the current Idq or the command value of the voltage Vdq, however, estimation of the values used in the present embodiment is not limited thereto. Instead of these values or together with at least one of these values, the control unit 20 can estimate a value to be used for generating the command value using another value, as a non-limiting example, the command value of the angular velocity ω.

Furthermore, in not only the speed control system but also the current control system, the control unit 20 can perform similar estimation to generate the command value. In this estimation, the control unit 20 can use an appropriate command value, an actual measured value, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A motor controller comprising:
   a first control circuit that outputs a first control value based on a rule base from a command value of an angular velocity and a measured value of an angular velocity;
   a second control circuit that outputs a second control value based on a learned model from the command value of the angular velocity and the measured value of the angular velocity;
   a determination circuit that determines a state based on at least the second control value; and
   a command circuit that acquires and outputs a control command value from the first control value and the second control value based on a result determined by the determination circuit.

2. The motor controller according to claim 1, wherein the command circuit outputs the second control value when the determination circuit does not detect an abnormality in the second control value, and
   outputs the first control value when the determination circuit detects an abnormality in the second control value.

3. The motor controller according to claim 2, wherein the determination circuit determines the state based on a difference between the first control value and the second control value.

4. The motor controller according to claim 1, wherein the second control circuit outputs a difference from a control value based on the rule base as the second control value based on the learned model.

5. The motor controller according to claim 4, wherein the command circuit outputs a value obtained by adding the second control value to the first control value when the determination circuit does not detect an abnormality in the second control value, and
   outputs the first control value when the determination circuit detects an abnormality in the second control value.

6. The motor controller according to claim 1 wherein the learned model is a model learned by reinforcement learning, and
   the determination circuit determines the state based on a reward output from the learned model.

7. The motor controller according to claim 1, wherein the learned model is a model that outputs likelihood together with the second control value, and
   the determination circuit determines the state based on the likelihood.

8. The motor controller according to claim 1, wherein the determination circuit compares a change in a measured value of an output current with a change in the second control value to determine the state.

9. The motor controller according to claim 8, wherein the determination circuit determines the state based on whether a positive/negative sign of the change in the measured value of the output current matches a positive/negative sign of the change in the second control value.

10. The motor controller according to claim 8, wherein the determination circuit determines the state based on a difference between a magnitude of the change in the measured value of the output current and a magnitude of the change in the second control value.

11. The motor controller according to claim 1, wherein the command circuit outputs a speed control value of a motor.

12. The motor controller according to claim 1, further comprising
a third control circuit that outputs a current control value based on the rule base from the first control value and a measured value of current, wherein
the second control circuit outputs the second control value based on the command value of the angular velocity, the measured value of the angular velocity, and the current control value.

13. The motor controller according to claim 1, wherein the measured value is obtained based on information sensed by a sensor.

14. The motor controller according to claim 1, wherein the measured value is estimated based on at least an output from the command circuit.

15. A motor controller comprising:
a first control circuit that outputs a first control value related to a speed control based on a rule base from a command value of an angular velocity and a measured value of an angular velocity;
a second control circuit that outputs a second control value related to a current control based on a learned model from the first control value and a measured value of current;
a third control circuit that outputs a third control value related to the current control based on the rule base from the first control value and the measured value of the current;
a determination circuit that determines a state based on at least the second control value; and
a command circuit that acquires and outputs a control command value related to current control from the second control value and the third control value based on a result determined by the determination circuit.

16. A motor controller comprising:
a processing circuit, wherein
the processing circuit receives a command value and a measured value,
acquires a first control value based on a rule base from the command value and the measured value,
acquires a second control value based on a learned model from the command value and the measured value,
determines a state based on at least the second control value, and
generates and outputs a control command signal from the first control value and the second control value based on the state that has been determined.

* * * * *